US012064908B2

United States Patent
Kawaguchi et al.

(10) Patent No.: US 12,064,908 B2
(45) Date of Patent: Aug. 20, 2024

(54) INJECTION MOLDING APPARATUS, INJECTION MOLDING METHOD AND PRODUCTION METHOD OF MOLDED PRODUCT USING INJECTION MOLDING APPARATUS, AND LAMINATED LENS

(71) Applicant: MITSUI CHEMICALS, INC., Tokyo (JP)

(72) Inventors: Masaru Kawaguchi, Fukuoka (JP); Shinsuke Ito, Omuta (JP); Kouji Suesugi, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 58 days.

(21) Appl. No.: 17/610,466

(22) PCT Filed: May 15, 2020

(86) PCT No.: PCT/JP2020/019438
§ 371 (c)(1),
(2) Date: Nov. 11, 2021

(87) PCT Pub. No.: WO2020/230889
PCT Pub. Date: Nov. 19, 2020

(65) Prior Publication Data
US 2022/0219361 A1 Jul. 14, 2022

(30) Foreign Application Priority Data
May 16, 2019 (JP) .................................. 2019-092682

(51) Int. Cl.
*B29C 45/16* (2006.01)
*B29C 45/00* (2006.01)
(Continued)

(52) U.S. Cl.
CPC .......... *B29C 45/16* (2013.01); *B29C 45/0001* (2013.01); *B29C 45/641* (2013.01);
(Continued)

(58) Field of Classification Search
None
See application file for complete search history.

(56) References Cited

U.S. PATENT DOCUMENTS

2001/0000331 A1 4/2001 Ram et al.
2004/0188873 A1 9/2004 Ono et al.
(Continued)

FOREIGN PATENT DOCUMENTS

JP H01258916 A 10/1989
JP H09254170 A 9/1997
(Continued)

OTHER PUBLICATIONS

English Translation of JP 2004299289A (Year: 2004).*

*Primary Examiner* — Jacob T Minskey
*Assistant Examiner* — Adrien J Bernard
(74) *Attorney, Agent, or Firm* — BUCHANAN, INGERSOLL & ROONEY PC

(57) ABSTRACT

An injection molding apparatus includes a substantially circular first substrate, a substantially circular second substrate disposed to face a surface of the first substrate, a fixing member which fixes a peripheral end portion of the first substrate and a peripheral end portion of the second substrate, and an injection portion which is provided in the fixing member and from which a composition is injected into a gap between the first substrate and the second substrate, in which a space connecting with the injection portion and the gap is provided in at least a part of a periphery of the gap, and a width of the space in a thickness direction is larger than a width of the gap in the thickness direction.

19 Claims, 8 Drawing Sheets

(51) Int. Cl.
  *B29C 45/64* (2006.01)
  *B29K 75/00* (2006.01)
  *B29K 105/00* (2006.01)
  *B29L 11/00* (2006.01)

(52) U.S. Cl.
  CPC .. *B29C 2045/0094* (2013.01); *B29K 2075/00* (2013.01); *B29K 2105/0094* (2013.01); *B29K 2995/0097* (2013.01); *B29L 2011/0016* (2013.01)

(56) References Cited

U.S. PATENT DOCUMENTS

| | | |
|---|---|---|
| 2008/0029914 A1 | 2/2008 | Hamanaka |
| 2014/0036227 A1* | 2/2014 | Tamura ............... G02C 7/102 |
| | | 351/159.57 |

FOREIGN PATENT DOCUMENTS

| | | | |
|---|---|---|---|
| JP | H10-250299 A | 9/1998 | |
| JP | 2003231135 A | 8/2003 | |
| JP | 2004-291606 A | 10/2004 | |
| JP | 2004-299289 A | 10/2004 | |
| JP | 2004299289 A * | 10/2004 | ............ B29C 33/42 |
| JP | 2006205710 A | 8/2006 | |
| JP | 2018072851 A | 5/2018 | |
| WO | 03/008171 A1 | 1/2003 | |

\* cited by examiner

INJECTION MOLDING APPARATUS, INJECTION MOLDING METHOD AND PRODUCTION METHOD OF MOLDED PRODUCT USING INJECTION MOLDING APPARATUS, AND LAMINATED LENS

TECHNICAL FIELD

The present invention relates to an injection molding apparatus, an injection molding method and a production method of a molded product using the injection molding apparatus, and a laminated lens

BACKGROUND ART

Examples of a method of obtaining a molded product by polymerizing a composition containing a polymerizable compound include a casting polymerization method and the like. In the casting polymerization method, an injection molding apparatus including a unit which fixes peripheral portions of two mold substrates by a fixing member in a state in which the two mold substrates face each other, and injects the composition into a space of the two mold substrates is generally used. Then, the molded product is obtained by a method of injecting the composition into the space and then polymerizing and curing the composition.

Patent Document 1 discloses a casting mold for lens molding, which is formed by providing a liquid reservoir unit which connects with a molding space between a mold and a gasket. It is disclosed that, as a result, it is possible to compensate a volume change in the molding space with an optical material of the liquid reservoir unit.

Patent Documents 2 and 3 disclose a technique in which a gasket (fixing member) having a special shape is used. It is disclosed that, as a result, an influence on a lens during a polymerization process is alleviated.

Patent Document 4 discloses a molding apparatus that produces a polarizing lens. Patent Document 4 discloses that a gap between a polarizing film and a mold is about 2 to 5 mm.

RELATED DOCUMENTS

Patent Documents

[Patent Document 1] Japanese Unexamined Patent Publication No. H1-258916
[Patent Document 2] Japanese Unexamined Patent Publication No. H9-254170
[Patent Document 3] Japanese Unexamined Patent Publication No. 2006-205710
[Patent Document 4] Japanese Unexamined Patent Publication No. 2018-72851

SUMMARY OF THE INVENTION

Technical Problem

However, in the related art, in a case in which a width of the gap formed between two mold substrates is narrow, it is difficult to homogeneously fill the gap with the composition, and mixing of air bubbles and the like may be observed in the molded product. In particular, in a case in which the viscosity of the composition is high, the above tendency is remarkable.

Solution to Problem

As a result of diligent studies, the present inventors have found that a gap is homogeneously filled with a composition by providing a space at a periphery of the gap formed between two mold substrates, and completed the present invention.

That is, the present invention can be shown as follows.

[1] An injection molding apparatus including a substantially circular first substrate, a substantially circular second substrate disposed to face a surface of the first substrate, a fixing member which fixes a peripheral end portion of the first substrate and a peripheral end portion of the second substrate, and an injection portion which is provided in the fixing member and from which a composition is injected into a gap between the first substrate and the second substrate, in which a space connecting with the injection portion and the gap is provided in at least a part of a periphery of the gap, and a width of the space in a thickness direction is larger than a width of the gap in the thickness direction.

[2] The injection molding apparatus according to [1], in which the space is provided over a substantially half of a circumference of the periphery of the gap.

[3] The injection molding apparatus according to [1], in which the space is provided over an entire periphery of the gap.

[4] The injection molding apparatus according to anyone of [1] to [3], in which the width of the gap in the thickness direction is substantially the same.

[5] The injection molding apparatus according to anyone of [1] to [4], in which the width of the gap in the thickness direction is 0.05 to 2 mm.

[6] The injection molding apparatus according to anyone of [1] to [5], in which the first substrate is a mold substrate having a forming surface for forming an objective surface of a lens, which is located on a second substrate side, and the second substrate is a resin substrate.

[7] The injection molding apparatus according to anyone of [1] to [5], in which the first substrate and the second substrate are mold substrates.

[8] The injection molding apparatus according to anyone of [1] to [7], in which a notch is provided in at least one of a periphery of the first substrate and a periphery of the second substrate, and the notch forms the space.

[9] The injection molding apparatus according to anyone of [1] to [6], in which the second substrate is a resin substrate, a notch is provided over an entire circumference of a periphery of the second substrate, and the notch forms the space.

[10] The injection molding apparatus according to any one of [1] to [7], in which the surface of the first substrate is a curved surface, the gap is provided between the surface and a curved surface of the second substrate facing the surface, at least one of the curved surface of the first substrate and the curved surface of the second substrate has a radius of curvature of at least a part of the curved surface of a periphery thereof smaller than a radius of curvature of the curved surface surrounded by the periphery, and the space is formed in at least a part of the periphery of the gap.

[11] The injection molding apparatus according to any one of [1] to [7], in which the second substrate is a resin substrate, the surface of the first substrate is a curved surface, the gap is provided between the surface and a curved surface of the second substrate facing the surface, a radius of curvature of an entire circumference of a periphery of the second substrate is smaller than a radius of curvature of the curved surface surrounded by the periphery, and the space is formed in the periphery of the gap.

[12] The injection molding apparatus according to any one of [1] to [11], in which the fixing member is a tape or a gasket.

[13] An injection molding method of a composition, in which the injection molding apparatus according to any one of [1] to [12] is disposed such that the injection portion is positioned above, and the injection molding method includes a step of injecting the composition from the injection portion into the space, and a step of filling the gap with the composition through the space.

[14] The injection molding method of a composition according to [13], in which in the step of injecting the composition, a viscosity of the composition is 5 to 1000 mPa·s.

[15] The injection molding method according to [13] or [14], in which the second substrate is a resin substrate, the resin substrate is a thiourethane resin consisting of an isocyanate compound and a thiol compound, and the composition includes the isocyanate compound and the thiol compound, in which the isocyanate compound is at least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate, and in which the thiol compound is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

[16] The injection molding method according to [15], in which the isocyanate compound and the thiol compound constituting the resin substrate are the same as the isocyanate compound and the thiol compound contained in the composition, respectively.

[17] A production method of a molded product, in which the injection molding apparatus according to any one of [1] to [12] is disposed such that the injection portion is positioned above, and the production method includes a step of injecting the composition from the injection portion into the space, a step of filling the gap with the composition through the space, and a step of curing the composition.

[18] The production method of a molded product according to [17], in which in the step of injecting the composition, a viscosity of the composition is 5 to 1000 mPa·s.

[19] The production method of a molded product according to [17] or [18], in which the second substrate is a resin substrate, the resin substrate is a thiourethane resin consisting of an isocyanate compound and a thiol compound, and the composition includes the isocyanate compound and the thiol compound, in which the isocyanate compound is at least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate, and in which the thiol compound is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

[20] The production method of a molded product according to [19], in which the isocyanate compound and the thiol compound constituting the resin substrate are the same as the isocyanate compound and the thiol compound contained in the composition, respectively.

[21] A laminated lens including a first resin layer having an objective surface, and a second resin layer, in which a thickness of at least a part of a periphery of the first resin layer is thicker than a thickness of a portion surrounded by the periphery.

[22] The laminated lens according to [21], in which the thickness of the portion surrounded by the periphery of the first resin layer is substantially the same.

In the present invention, the substantially circular shape (circular shape) encompasses from a perfect circular shape to an elliptical shape.

Advantageous Effects of Invention

With the injection molding apparatus according to the present invention, it is possible to homogeneously fill a gap having a narrow width in a thickness direction, which is formed between two substrates, even with a composition having a high viscosity, and it is possible to produce a molded product having excellent appearance in which mixing of air bubbles and the like are suppressed with good yield.

DESCRIPTION OF EMBODIMENTS

Figure 1:
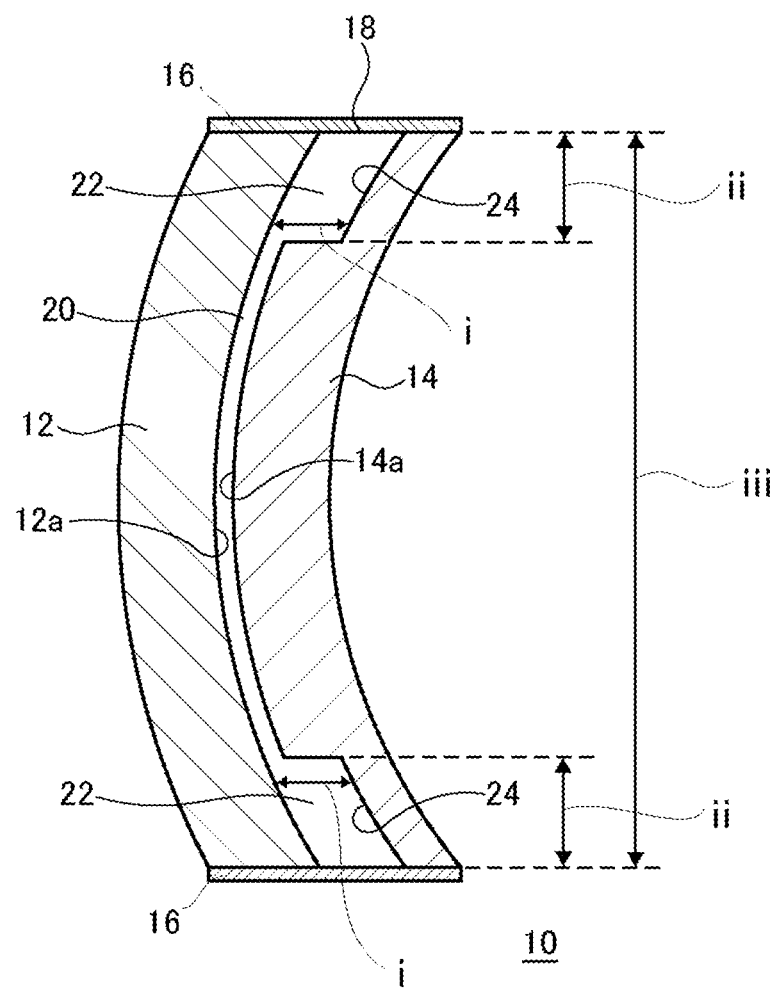
FIG. 1 is a schematic cross-sectional view schematically showing an injection molding apparatus according to a first embodiment.

Hereinafter, an injection molding apparatus according to the present invention will be described.

Injection Molding Apparatus

The injection molding apparatus according to the present invention includes a substantially circular first substrate, a substantially circular second substrate disposed to face a surface of the first substrate, a fixing member which fixes a peripheral end portion of the first substrate and a peripheral end portion of the second substrate, and an injection portion which is provided in the fixing member and from which a composition is injected into a gap between the first substrate and the second substrate.

A space connecting with the injection portion and the gap is provided in at least a part of a periphery of the gap, and a width of the space in a thickness direction is larger than a width of the gap in the thickness direction. The space need only be formed on at least a part of the periphery of the gap, but from the viewpoint of the effect of the present invention, it is preferable that the space be provided over a substantially half of a circumference of the periphery or be provided over an entire periphery of the gap.

As described above, with the injection molding apparatus according to the present invention, it is possible to homogeneously fill a gap having a narrow width, which is formed between the first substrate and the second substrate, even with a composition having a high viscosity, and it is possible to produce a molded product having excellent appearance in which mixing of air bubbles and the like are suppressed with good yield. Further, in a case in which the obtained molded product is used as an optical material, it is possible to produce an optical material having excellent appearance in which mixing of air bubbles or a stria is suppressed with good yield.

An embodiment of the injection molding apparatus according to the present invention will be described, by a first embodiment or a second embodiment, with reference to the accompanying drawings. Note that the same reference numerals will not be repeated as appropriate. In the present embodiment, "to" represents "larger than or equal to" to "less than or equal to" unless otherwise specified.

First Embodiment

As shown in a schematic cross-sectional view of FIG. 1, an injection molding apparatus 10 according to the present embodiment includes a substantially circular first substrate 12, a substantially circular second substrate 14 disposed to face a surface 12a of the first substrate 12, a fixing member 16 which fixes a peripheral end portion of the first substrate 12 and a peripheral end portion of the second substrate 14, and an injection portion 18 which is provided in the fixing member 16 and from which a composition is injected into a gap 20 between the first substrate 12 and the second substrate 14. A space 22 is provided over an entire periphery of the gap 20.

The substantially circular first substrate 12 is not particularly limited as long as the molded product can be prepared in the gap 20, but can be made of, for example, glass, metal, resin, or the like. The substantially circular first substrate 12 can be used as a mold substrate, and can also be a laminated body of a thin film-shaped molded product formed in the gap 20 and the first substrate 12. The first substrate 12 has the surface 12a facing the second substrate 14. In a case in which the molded product is used as a laminated film of an optical lens, the surface 12a can be a forming surface on which an objective surface is formed.

The substantially circular second substrate 14 is not particularly limited as long as the molded product can be prepared in the gap 20, but can be made of, glass, metal, resin, or the like. The substantially circular second substrate 14 can be used as a mold substrate, can also be a laminated body of a thin film-shaped molded product formed in the gap 20 and the second substrate 14, and can be a laminated body of the first substrate 12, a thin film-shaped molded product, and the second substrate 14.

The substantially circular second substrate 14 has a surface 14a facing the surface 12a of the first substrate 12, and the first substrate 12 and the second substrate 14 are curved in the same direction. A radius of curvature of the surface (curved surface) 12a and the surface (curved surface) 14a are substantially the same, and a width of the gap 20 between these surfaces in the thickness direction is substantially the same. The width of the gap 20 in the thickness direction is 0.05 to 2 mm, preferably 0.1 to 1.0 mm, and more preferably 0.1 to 0.6 mm.

With the injection molding apparatus 10 according to the present embodiment, even in a case of the gap 20 having a narrow width as described above, it is possible to homogeneously fill the gap 20 with the composition through the space 22, and it is possible to produce the molded product having excellent appearance in which mixing of air bubbles and the like are suppressed with good yield.

The second substrate 14 has a notch 24 over an entire circumference of the periphery thereof. As shown in FIG. 1, the injection molding apparatus 10 includes the space 22 surrounded by the notch 24 of the second substrate 14, the first substrate 12, and the fixing member 16. A width i of the space 22 in a substrate thickness direction is not particularly limited as long as the width i is larger than the width of the gap 20, and it is possible to appropriately change an upper limit value depending on the thickness, strength, or the like of the second substrate 14. For example, it is preferable that the width i of the space 22 in a substrate diameter direction be about 1 to 10 mm.

A width ii of the space 22 in the substrate diameter direction is not particularly limited as long as the space 22 is formed, but is preferably about 1 to 10 mm.

A diameter iii of the second substrate 14 is about 50 mm to 100 mm.

A ratio (ii/iii) of the width ii of the space 22 in the substrate diameter direction to the diameter iii of the second substrate 14 exceeds 0 and equal to or less than 0.27, preferably about 0.01 to 0.27.

Figure 2:
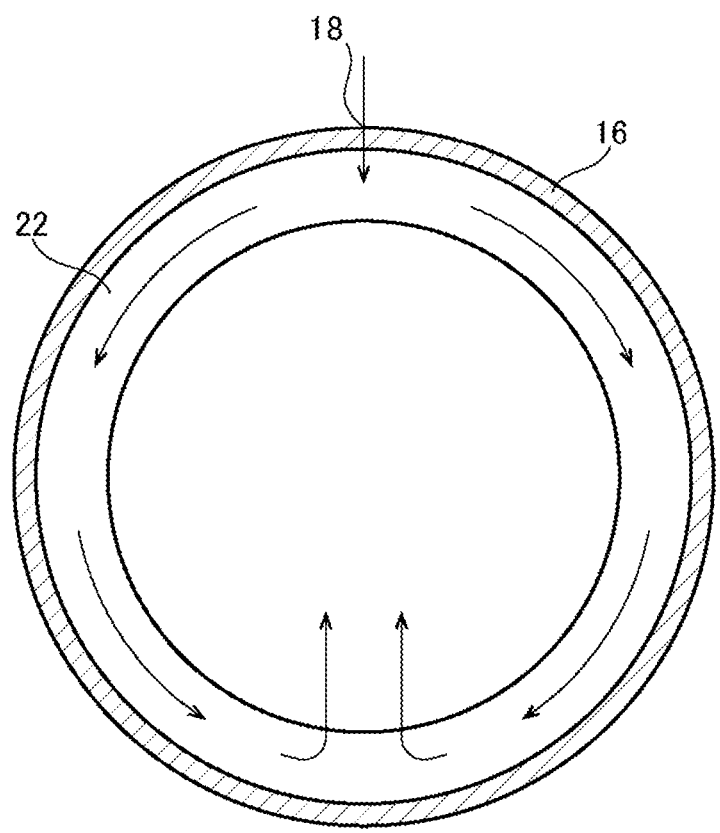
FIG. 2 is a schematic plan view schematically showing the injection molding apparatus according to the first embodiment.

As shown in FIG. 1, the space 22 connects with the injection portion 18 and the gap 20, and as shown in a schematic plan view of FIG. 2, a configuration is adopted in which it is possible to fill the gap 20 with the composition injected from the injection portion 18 through the space 22.

In the present embodiment, the first substrate 12 and the second substrate 14 can be the mold substrates. In a case in which the thin film-shaped molded product formed in the gap 20 is used as the laminated film of the optical lens, the first substrate 12 is the mold substrate having the forming surface (surface 12a) for forming the objective surface of a lens, which is located on the second substrate 14 side, and the second substrate 14 can be a resin substrate.

Examples of a monomer component constituting the resin substrate, which is the second substrate 14, include a monomer component contained in the composition described below, and these monomer components may be the same or different.

The fixing member 16 is not particularly limited as long as the surface 12a of the first substrate 12 and the surface 14a of the second substrate 14 can be disposed to face each other, but the fixing member 16 can be a tape, a gasket, or the like. By winding the peripheral end portion of the first substrate 12 and the peripheral end portion of the second substrate 14 by the tape, the positions thereof can be fixed.

The injection portion 18 (not shown) is provided in the fixing member 16 such that the composition can be injected into the space 22. Examples thereof include an opening portion, a joint of an injection device, and the like. The composition can be injected from the injection portion 18 into the space 22, and an injection unit such as a pipette tip, a syringe, or an automatic injection device can be connected to the injection portion 18.

The viscosity of the composition used in the present embodiment can be 5 to 1000 mPa·s, preferably 10 to 500 mPa·s.

With the injection molding apparatus 10 according to the present embodiment, even in a case of the composition having the viscosity as described above, it is possible to homogeneously fill the gap 20 with the composition through the space 22, and it is possible to produce the molded product having excellent appearance in which mixing of the air bubbles and the like are suppressed with good yield.

The monomer components and the like constituting the composition will be described below.

Although the embodiment of the present invention has been described above, the embodiment is an example of the present invention, and it is possible to adopt various configurations other than the above as long as the effects of the present invention are not impaired.

In FIG. 1, the example has been described in which the space 22 is formed by being surrounded by the notch 24 of the second substrate 14, the first substrate 12, and the fixing member 16. However, a groove having a U-shaped cross section may be provided over the entire circumference of the periphery of the second substrate 14, and the space 22 may be formed by the groove formed in the second substrate 14 and the first substrate 12.

In FIG. 1, the example has been described in which the surface 12a of the first substrate 12 is a concave surface and the surface 14a of the second substrate 14 is a convex surface. However, the surface 12a may be a convex surface and the surface 14a may be a concave surface.

In FIG. 1, the example has been described in which the first substrate 12 and the second substrate 14 are curved. However, it is possible to adopt various shapes for the molded product depending on the application, and for example, both the first substrate 12 and the second substrate 14 may also be a substantially circular flat plate. That is, as the resin substrate, which is the second substrate 14, there is a resin lens on which both surfaces are the curved surfaces, a resin lens on which only surface 14a is the curved surface, or a resin flat plate on which both surfaces are flat surfaces. The same applies to another embodiment.

Figure 3:
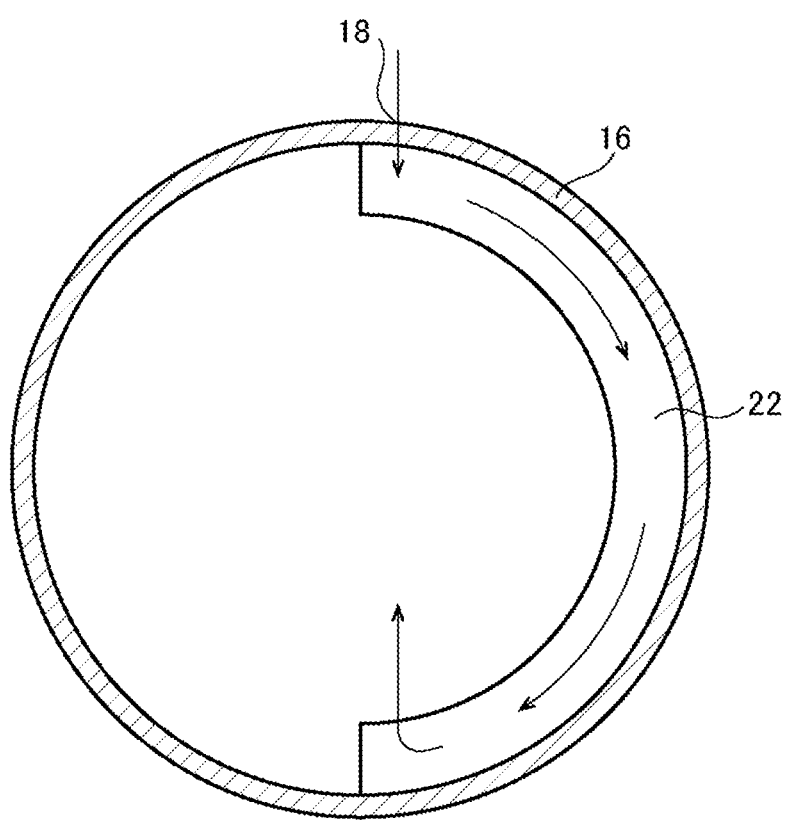
FIG. 3 is a schematic plan view schematically showing another aspect of a space shape in the injection molding apparatus according to the first embodiment.

In FIG. 1, the example has been described in which the space 22 is provided over the entire circumference of the periphery of the second substrate 14. However, as shown in FIG. 3, the space 22 may be provided over a substantially half of the circumference of the periphery of the second substrate 14 and may be provided over any position selected from a substantially half of the circumference (½) to less than the entire circumference.

Figure 4:
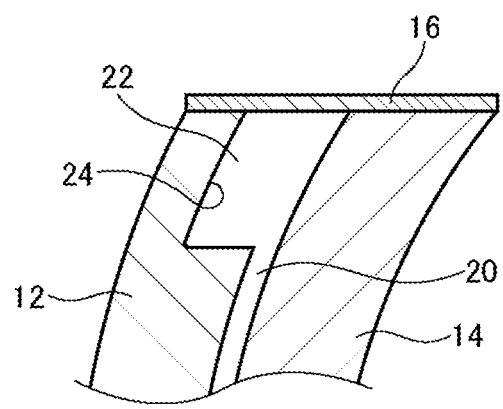
FIG. 4 is an enlarged cross-sectional view schematically showing another aspect of a space cross section in the injection molding apparatus according to the first embodiment.
Figure 5:
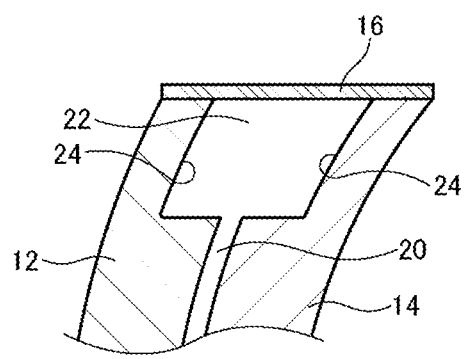
FIG. 5 is an enlarged cross-sectional view schematically showing still another aspect of the space cross section in the injection molding apparatus according to the first embodiment.

As shown in FIG. 4, the notch 24 may be provided on the periphery of the first substrate 12 to form the space 22, and as shown in FIG. 5, the notch 24 may be provided on the peripheries of the first substrate 12 and the second substrate 14 to form the space 22. Further, the notches 24 may be provided alternately on the first substrate 12 and the second substrate 14 in a circumferential direction.

Second Embodiment

Figure 6:
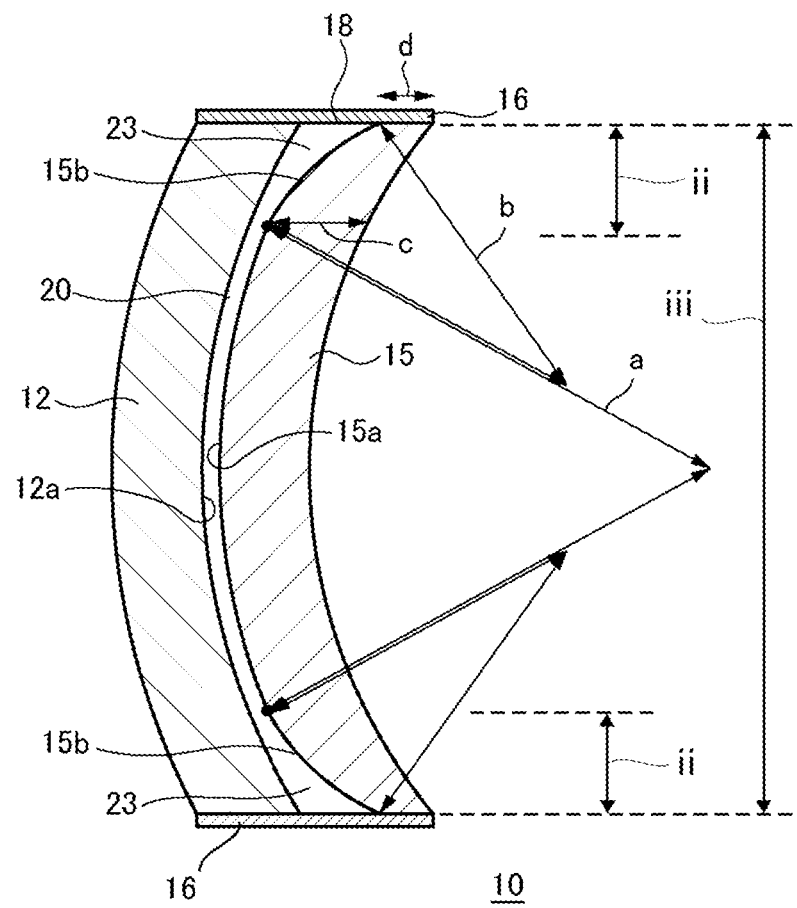
FIG. 6 is a schematic cross-sectional view schematically showing an injection molding apparatus according to a second embodiment.

As shown in a schematic cross-sectional view of FIG. 6, the injection molding apparatus 10 according to the present embodiment includes the substantially circular first substrate 12, a substantially circular second substrate 15 disposed to face the surface 12a of the first substrate 12, the fixing member 16 which fixes the peripheral end portion of the first substrate 12 and a peripheral end portion of the second substrate 15, and the injection portion 18 which is provided in the fixing member 16 and from which the composition is injected into a gap 20 between the first substrate 12 and the second substrate 15.

The gap 20 is provided between the curved surface 12a of the first substrate 12 and a curved surface 15a of the second substrate 15 facing the curved surface 12a, and a radius of curvature b of a curved surface 15b of a periphery of the curved surface 15a of the second substrate 15 is smaller than a radius of curvature a of the curved surface 15a surrounded by the periphery. As a result, a space 23 is formed on the periphery of the gap 20.

The substantially circular first substrate 12, the surface 12a, and the injection portion 18 (not shown) are the same as those in the first embodiment, and the description thereof will not be repeated.

The substantially circular second substrate 15 is not particularly limited as long as the molded product can be prepared in the gap 20, but can be made of glass, metal, resin, or the like. The substantially circular second substrate 15 can be used as a mold substrate, can also be a laminated body of a thin film-shaped molded product formed in the gap 20 and the second substrate 15, and can be a laminated body of the first substrate 12, a thin film-shaped molded product, and the second substrate 15.

The substantially circular second substrate 15 has a surface 15a facing the surface 12a of the first substrate 12, and the first substrate 12 and the second substrate 15 are curved in the same direction. A radius of curvature of the surface (curved surface) 12a and the surface (curved surface) 15a are substantially the same, and a width of the gap 20 between these surfaces in the thickness direction is substantially the same. The width of the gap 20 in the thickness direction is 0.05 to 2 mm, preferably 0.1 to 1.0 mm, and more preferably 0.1 to 0.6 mm.

The second substrate 15 has the curved surface 15a and the curved surface 15b on the peripheral portion extending over the entire circumference. The radius of curvature b of the curved surface 15b on the surface periphery is different from the radius of curvature a of the curved surface 15a surrounded by the curved surface 15b, and the radius of curvature b is smaller than the radius of curvature a. As a result, a width c of the second substrate 15 on the curved surface 15a in the thickness direction is larger than a width d of the second substrate 15 on the curved surface 15b of the peripheral portion in the thickness direction. Since the radius of curvature of the surface 12a of the first substrate 12 is fixed, the space 23 is formed on the periphery of the gap 20.

The radius of curvature b of the curved surface 15b is not particularly limited as long as the radius of curvature b is smaller than the radius of curvature a of the curved surface 15a surrounded by the curved surface 15b, but the radius of curvature a can be preferably 100 mm to 500 mm and more preferably 150 mm to 300 mm, and the radius of curvature b can be preferably 10 mm to 100 mm and more preferably 15 mm to 50 mm.

A width ii of the peripheral portion provided with the curved surface 15b in the substrate diameter direction is not particularly limited as long as the space 23 is formed, but is preferably about 1 to 10 mm.

A diameter iii of the second substrate 15 is about 50 mm to 100 mm.

A ratio (ii/iii) of the width ii of the peripheral portion provided with the curved surface 15a in the substrate diameter direction to the diameter iii of the second substrate 15 exceeds 0 and equal to or less than 0.27, preferably about 0.01 to 0.27.

With the injection molding apparatus 10 according to the present embodiment, even in a case of the gap 20 having a narrow width as described above, it is possible to homogeneously fill the gap 20 with the composition through the space 23, and it is possible to produce the molded product having excellent appearance in which mixing of the air bubbles and the like are suppressed with good yield.

As shown in FIG. 6, the space 23 connects with the injection portion 18 and the gap 20, and as shown in a schematic plan view of FIG. 2, a configuration is adopted in which it is possible to fill the gap 20 with the composition injected from the injection portion 18 through the space 23.

In the present embodiment, the first substrate 12 and the second substrate 15 can be the mold substrates. In a case in which the thin film-shaped molded product formed in the gap 20 is used as the laminated film of the optical lens, the first substrate 12 the mold substrate having the forming surface for forming the objective surface of a lens, which is located on the second substrate 15 side, and the second substrate 15 can be a resin substrate.

Examples of a monomer component constituting the resin substrate, which is the second substrate 15, include a monomer component contained in the composition described below, and these monomer components may be the same or different.

The viscosity of the composition used in the present embodiment can be 5 to 1000 mPa·s, preferably 10 to 500 mPa·s.

With the injection molding apparatus 10 according to the present embodiment, even in a case of the composition having the viscosity as described above, it is possible to homogeneously fill the gap 20 with the composition through the space 23, and it is possible to produce the molded product having excellent appearance in which mixing of the air bubbles and the like are suppressed with good yield.

The monomer components and the like constituting the composition will be described below.

Although the embodiment of the present invention has been described above, the embodiment is an example of the present invention, and it is possible to adopt various configurations other than the above as long as the effects of the present invention are not impaired.

In FIG. 6, the example has been described in which the space 23 is provided over the entire circumference of the periphery of the second substrate 15. However, the space 23 may be provided over a substantially half of the circumference of the periphery of the second substrate 15 and may be provided over any position selected from a substantially half of the circumference (½) to less than the entire circumference.

In the present embodiment, the example has been described in which the surface 12a of the first substrate 12 is a curved flat plate having substantially the same radius of curvature on the entire surface, and the second substrate 15 has the curved surface 15a and the curved surface 15b on the peripheral portion extending over the entire circumference. However, it is possible to adopt a reversed configuration in which the entire surface of the second substrate 15 facing the first substrate 12 is a curved flat plate having substantially the same radius of curvature and the surface of the first substrate 12 facing the second substrate 15 is provided with the curved surface having a large radius of curvature on the peripheral portion thereof to form the space.

Further, the second substrate 15 may have the curved surface 15b on the peripheral portion, the first substrate 12 may have the curved surface on the peripheral portion, and the space 23 may be formed by the curved surfaces facing each other on the peripheral portion. Further, the curved surfaces of the peripheral portion may be provided alternately on the first substrate 12 and the second substrate 14 in a circumferential direction.

Injection Molding Method and Production Method of Molded Product

An injection molding method according to the present invention is provided in which the injection molding apparatus according to the present invention is disposed such that the injection portion is positioned above, and the injection molding method includes a step of injecting the composition from the injection portion into the space, and a step of filling the gap with the composition through the space.

In addition, a production method of the molded product according to the present invention further includes a step of curing the composition filled in the gap.

In the present embodiment, as will be described below, it is possible to add a functionality imparting agent such as a specific wavelength absorbing agent to the composition. Therefore, as compared with a case in which a film is attached to a front surface of a lens base material or a coat layer is formed, it is easy to optionally adjust an amount of addition thereof, and it is possible to increase the amount of addition depending on a functional design. Also, it is easy to add a plurality of functionality imparting agents, and a single layer can exhibit a plurality of functions as compared with a film or a coat layer.

Hereinafter, embodiments of the injection molding method and the production method of the molded product according to the present invention will be described in details with reference to the accompanying drawings. Note that the same reference numerals will not be repeated as appropriate. Note that although the description will be described by an example in which the injection molding apparatus 10 according to the first embodiment is used, the same can be performed in a case in which the injection molding apparatus 10 according to the second embodiment is used.

In the injection molding method according to the present embodiment, first, the injection molding apparatus 10 according to the present embodiment is disposed such that the injection portion 18 is positioned above in a vertical direction. Note that in order to prepare a polarizing lens, the resin substrate can be used as the second substrate 14, and a polarizing film can be adhered to a front surface of the surface 14a in advance.

The polarizing film can be made of a thermoplastic resin. As the thermoplastic resin, there is a single layer such as thermoplastic polyester, thermoplastic polycarbonate, thermoplastic polyolefin, thermoplastic polyimide, thermoplastic polyamide, polyvinyl alcohol (PVA), or triacetyl cellulose (TAC), or a laminate of a plurality of layers of these resins. From the viewpoint of water resistance, heat resistance, and moldability, thermoplastic polyester and thermoplastic polycarbonate are preferable, and from the viewpoint of water resistance and weather resistance, thermoplastic polyester is more preferable.

Examples of the thermoplastic polyester include polyethylene terephthalate, polyethylene naphthalate, and polybutylene terephthalate, and polyethylene terephthalate is preferable from the viewpoint of water resistance, heat resistance, and moldability.

A dichroic dye or the like can be added to a functional layer made of the thermoplastic resin for the purpose of imparting polarization. A known dye is used as the dichroic dye. For example, the known dye is disclosed in Japanese Unexamined Patent Publication No. S61-087757, Japanese Unexamined Patent Publication No. S61-285259, Japanese Unexamined Patent Publication No. S62-270664, Japanese Unexamined Patent Publication No. S62-275163, Japanese Unexamined Patent Publication No. H1-103667, and the like. Specifically, there are anthraquinone-based, quinophthalone-based, and azo-based pigments.

Then, the composition is injected into the space 22 from the injection portion 18 by using an injection unit (not shown). An injection rate may be appropriately set depending on the viscosity of the composition and the like, and may be changed such that a filling rate in the space 22 is homogeneous.

As shown in the schematic plan view of FIG. 2, the composition injected into the space 22 is mainly moved downward in the space 22 and is moved into the gap 20 when reaching the lowermost portion. Since the gap 20 is mainly filled with the composition from the lower portion, it is possible to obtain the molded product having an excellent appearance in which mixing of the air bubbles and the like are suppressed, and since the gap 20 is homogeneously filled in a fixed direction, it is possible to obtain the molded product in which the generation of a stria is suppressed.

As the composition used in the present embodiment, there is a resin composition or a polymerizable composition. The resin is at least one selected from the group consisting of a polyester resin, a polycarbonate resin, a polyolefin resin, a poly(meth)acrylate resin, and a polysiloxane resin.

The polymerizable compound is at least one selected from a polyiso(thio)cyanate compound, a (thio)epoxy compound, an oxetanyl compound, a thietanyl compound, a (meth)acryloyl compound, a (meth)allyl compound, an allyl carbonate compound, an alkene compound, an alkyne compound, a bifunctional or higher active hydrogen compound, an acid anhydride, an alkoxysilane compound, and hydrolysates thereof.

In the present embodiment, it is preferable that the molded product be used as the optical material. Hereinafter, the polymerizable composition, which is used for preparing the optical material containing poly(thio)urethane or poly(thio)urethane urea as the resin, will be described.

The polymerizable composition according to the present embodiment includes (A) an isocyanate compound, and (B) at least one active hydrogen compound selected from the group consisting of a polythiol compound having two or more mercapto groups, a hydroxythiol compound having one or more mercapto groups and one or more hydroxyl groups, a polyol compound having two or more hydroxyl groups, and an amine compound.

Isocyanate Compound (A)

Examples of the isocyanate compound (A) include an aliphatic isocyanate compound, an alicyclic isocyanate compound, an aromatic isocyanate compound, a heterocyclic isocyanate compound, and an aromatic aliphatic isocyanate compound, and one or a combination of two or more thereof is used. These isocyanate compounds may include a dimer, a trimer, and a prepolymer.

Examples of the isocyanate compound include the compounds described as an example in International Publication No. WO2011/055540.

In the present embodiment, the isocyanate compound (A) preferably includes at least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate, and more preferably includes at least one selected from xylylene diisocyanate, phenylene isocyanate, tolylene diisocyanate, diphenylmethane diisocyanate, 2,5-bis(isocyanatomethyl)bicyclo-[2.2.1]-heptane, and 2,6-bis(isocyanatomethyl)bicyclo-[2.2.1]-heptane.

Active Hydrogen Compound (B)

In the present embodiment, as the active hydrogen compound (B), at least one selected from the group consisting of a polythiol compound having two or more mercapto groups, a hydroxythiol compound having one or more mercapto groups and one or more hydroxyl groups, a polyol compound having two or more hydroxyl groups, and an amine compound can be used. Examples of the active hydride include the compounds described as an example in International Publication No. WO2016/125736.

From the viewpoint of the effects of the present invention, the active hydrogen compound (B) is preferably at least one selected from a polythiol compound having two or more mercapto groups and a hydroxythiol compound having one or more mercapto groups and one or more hydroxyl groups, and more preferably at least one selected from a polythiol compound having two or more mercapto groups.

The polythiol compound is preferably at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, pentaerythritol tetrakis(2-mercaptoacetate), pentaerythritol tetrakis(3-mercaptopropionate), 2,5-bis(mercaptomethyl)-1,4-dithiane, bis(mercaptoethyl)sulfide, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithietane, 1,1,2,2-tetrakis(mercaptomethylthio)ethane, 3-mercaptomethyl-1,5-dimercapto-2,4-dithiapentane, tris(mercaptomethylthio)methane, and ethylene glycol bis(3-mercaptopropionate), and more preferably at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

In a case in which the second substrate 14 is the resin substrate, the resin substrate is preferably a thiourethane resin consisting of the following isocyanate compound and the following thiol compound, and the composition preferably contains the following isocyanate compound and the following thiol compound.

Isocyanate Compound

At least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate.

Thiol Compound

At least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

In the present embodiment, a molar ratio of an active hydrogen group in the active hydrogen compound (B) to an isocyanato group in the isocyanate compound (A) is within a range of 0.8 to 1.2, preferably within a range of 0.85 to 1.15, and more preferably within a range of 0.9 to 1.1. Within the range described above, it is possible to obtain a resin suitably used as the optical material, particularly a plastic lens material for eyeglasses.

Examples of an optional additive include a specific wavelength absorbing agent, an adhesion improving agent, a polymerization catalyst, an internal mold release agent, an ultraviolet absorbing agent, and the like. In the present embodiment, in a case of obtaining polyurethane and polythiourethane, the polymerization catalyst may or may not be used.

Examples of the internal mold release agent include acidic phosphoric acid ester. Examples of the acidic phosphoric acid ester include phosphoric acid monoester and phosphoric acid diester, which can be used alone or in combination of two or more thereof.

Examples of the ultraviolet absorbing agent include a benzophenone-based ultraviolet absorbing agent, a triazine-based ultraviolet absorbing agent, a benzotriazole-based ultraviolet absorbing agent, and the like, and preferably a benzotriazole-based ultraviolet absorbing agent such as 2-(2H-benzotriazole-2-yl)-4-tert-octylphenol or 2-(5-chloro-2H-benzotriazole-2-yl)-4-methyl-6-tert-butylphenol. These ultraviolet absorbing agents can be used alone or in combination of two or more thereof.

It is possible to obtain the polymerizable composition by mixing the components described above by a predetermined method.

It is possible to obtain the molded product by filling the gap 20 with the polymerizable composition and then polymerizing the composition. Examples of a polymerization method include a known method in the related art, and a condition thereof is not particularly limited.

Since a condition differs depending on a type and a usage amount of components, a type and a usage amount of a catalyst, a shape of the mold, and the like, the polymerization condition is not limited, but the polymerization is carried out, approximately, for 1 to 50 hours at a temperature of −50 to 150° C.

In a case in which both the first substrate 12 and the second substrate 14 are molds, the molded product can be separated from the first substrate 12 and the second substrate 14 to obtain a thin film for lamination. In a case in which the second substrate 14 is the resin substrate, the molded product can be separated from the first substrate 12 and obtained as a laminated body of the layer, which is made of the molded product, and the resin substrate.

Note that as described above, by adhering the polarizing film to the front surface of the surface 14a in advance, it is possible to obtain the polarizing lens in which the layer made of the molded product, the polarizing film, and the resin substrate are laminated in this order. Since the molded product has a thick portion cured in the space 22 at the peripheral portion thereof, the thick portion can be scraped off as appropriate depending on the application, and in a case of the laminated body with the resin substrate, the thick portion can be scraped off as appropriate together with the resin substrate.

Laminated Lens

Figure 7:
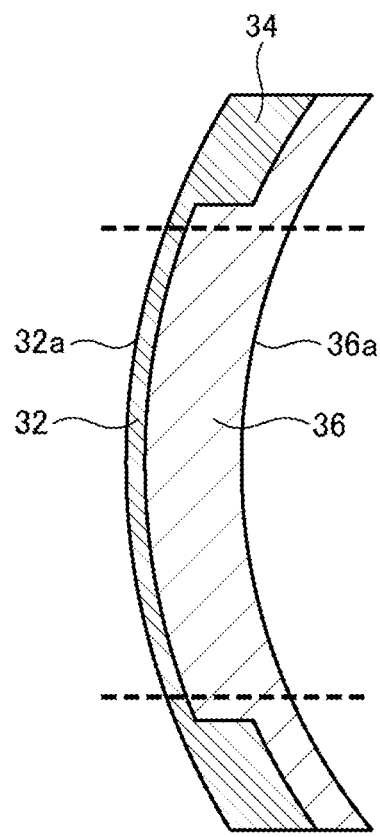
FIG. 7 is a schematic cross-sectional view of a laminated lens according to the present embodiment.

In the injection molding method according to the present embodiment, in a case in which the second substrate 14 constituting the mold is the resin substrate, a laminated lens 30 shown in FIG. 7 is prepared. The laminated lens 30 includes a first resin layer 32 having an objective surface 32a and a second resin layer 36 (second substrate 14 made of the resin substrate).

The first resin layer 32 is provided with a protrusion portion 34 at a peripheral portion thereof, and the protrusion portion 34 is integrated to be embedded in the second resin layer 36. A thickness of the protrusion portion 34 on a periphery of the first resin layer 32 is thicker than a thickness of the first resin layer 32 on a portion surrounded by the protrusion portion 34.

The laminated lens 30 according to the present embodiment can be used as the laminated lens by performing polishing at a dotted line portion shown in FIG. 7. Further, it is possible to polish a facing surface 36a of the second resin layer 36.

Although the embodiment of the present invention has been described above, the embodiment is an example of the present invention, and it is possible to adopt various configurations other than the above as long as the effects of the present invention are not impaired.

In FIG. 7, the example has been described in which the first resin layer 32 and the second resin layer 36 are curved. However, it is possible to adopt various shapes for the molded product depending on the application, and for example, both the first resin layer 32 and the second resin layer 36 may also be a substantially circular flat plate.

In FIG. 7, the example has been described in which the protrusion portion 34 is provided over the entire circumference of the periphery of the first resin layer 32. However the protrusion portion 34 may be provided over a substantially half of the circumference of the periphery of the first resin layer 32, and may be provided over any position selected from a substantially half of the circumference (½) to less than the entire circumference.

EXAMPLES

Hereinafter, the present invention will be described in more detail by Examples, but the present invention is not limited thereto.

Casting Property

The time required for casting the polymerizable composition for the optical material into the gap of the injection molding apparatus was evaluated based on the following criteria.
A: Casting into the gap was within 1 minute.
B: Casting into the gap exceeded 1 minute.
C: The air bubbles in the gap generated during casting did not escape, and thus casting into the gap was abandoned.

Appearance (Presence or Absence of Air Bubbles)

The air bubbles in the lens were evaluated based on the following criteria.
A: The air bubbles were not observed in the lens.
B: The air bubbles were observed at an edge portion of the lens.
C: The air bubbles were observed in the entire lens.

Example 1

Preparation of Lens for Mold (Second Substrate 14) and Injection Molding Apparatus 10

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, 1.5 parts by weight of Viosob 583 manufactured by BASF as an ultraviolet absorbing agent, and 0.00005 parts by weight of Plast Blue 8514 manufactured by ARIMOTO CHEMICAL CO., LTD. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 μm PTFE filter to obtain the preparation solution. A casting mold was prepared in which a front glass mold (R of the concave surface facing a back glass mold was 215.80 mm) and the back glass mold (R of the convex surface facing the front glass mold was 75.53 mm) were fixed by the tape to face each other. The preparation solution was cast into the gap between the molds (separation distance of a center portion was 1.2 mm), and a temperature was raised from 25° C. to 120° C. for 16 hours. The preparation solution was cooled to room temperature and removed from the glass mold to obtain a lens having a diameter of 81 mm. The lens was processed to a diameter of 75 mm, and, out of an edge thickness of 11 mm, 7 mm in the thickness direction from the convex surface (surface 14a) and 2 mm of the thickness in the diameter direction from the edge portion (peripheral end portion) were scraped off to prepare the second substrate (resin substrate) 14 having a notch 24 over the entire circumference.

The glass mold having the concave surface (surface 12a) of which R was 215.80 mm was used as the first substrate 12, and the end portion of the first substrate 12 and the end portion of the second substrate 14 were wound and fixed by the tape (fixing member 16) such that the concave surface (surface 12a) of the first substrate 12 and the convex surface (surface 14a) of the second substrate 14 face each other to prepare the injection molding apparatus 10 including the gap 20. The separation distance of the center portion of the gap 20 was 0.5 mm. In the injection molding apparatus 10, the space 22 is formed over the entire periphery of the gap 20, which is surrounded by the tape (fixing member 16), the concave surface (surface 12a) of the first substrate 12, and the notch 24. An opening (injection portion 18) connecting with the space 22 was formed in the fixing member 16.

Preparation of Laminated Lens

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, and 1.5 parts by weight of Viosob 583 manufactured by BASF as an ultraviolet absorbing agent. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 μm PTFE filter to obtain the preparation solution. A viscosity of the preparation solution measured at 20° C. with a B-type viscometer was 35 mPa·s. The preparation solution was injected at an injection rate of 30 ml/min by an injection tool including a pipette tip through the opening (injection portion 18) positioned at the upper end of the injection molding apparatus 10 obtained as described above. As a result of observation, as shown in FIG. 2, it was observed that the preparation solution was mainly moved downward in the space 22 and the gap 20 was filled with the preparation solution from the lower portion of the space 22. After casting, a temperature was raised from 25° C. to 120° C. for 16 hours. The preparation solution was cooled to room temperature and removed from the glass mold (first substrate 12) to obtain the laminated lens in which the resin layer was laminated on the resin substrate (second substrate 14). Further, the obtained lens was annealed at 120° C. for 2 hours.

The results of evaluation are shown in Table-1.

Example 2

Preparation of Lens for Mold (Second Substrate 14) and Injection Molding Apparatus 10

1.5 parts by weight of Tinuvin PS manufactured by BASF as the ultraviolet absorbing agent and 90.9 parts by weight of bis(2,3-epithiopropyl)disulfide were stirred and mixed at 30° C. to obtain a homogeneous solution. 9.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.09 parts by weight of N,N-dicyclohexylmethylamine, and 0.02 parts by weight of N,N-dimethylcyclohexylamine were added in the homogeneous solution, and stirred and mixed at 20° C. to obtain a liquid mixture. The liquid mixture was defoamed at 600 Pa for 1 hour and filtered through a 1 μm PTFE filter to obtain the preparation solution. A casting mold was prepared in which a front glass mold (R of the concave surface facing a back glass mold was 215.80 mm) and the back glass mold (R of the convex surface facing the front glass mold was 75.53 mm) were fixed by the tape to face each other. The preparation solution was cast into the gap between the molds (separation distance of a center portion was 1.2 mm), and a temperature was raised from 25° C. to 120° C. for 16 hours. The preparation solution was cooled to room temperature and removed from the glass mold to obtain a lens having a diameter of 81 mm. The lens was processed to a diameter of 75 mm, and, out of an edge thickness of 11 mm, 7 mm in the thickness direction from the convex surface (surface 14a) and 2 mm of the thickness in the diameter direction from the edge portion (peripheral end portion) were scraped off to prepare the second substrate (resin substrate) 14, which is shown in FIG. 1, having a notch 24 over the entire circumference.

The glass mold having the concave surface (surface 12a) of which R was 215.80 mm was used as the first substrate 12, and the end portion of the first substrate 12 and the end portion of the second substrate 14 were wound and fixed by the tape (fixing member 16) such that the concave surface (surface 12a) of the first substrate 12 and the convex surface (surface 14a) of the second substrate 14 face each other to prepare the injection molding apparatus 10 including the gap 20, which is shown in FIG. 1. The separation distance of the center portion of the gap 20 was 0.5 mm. In the injection molding apparatus 10, the space 22 was formed over the entire periphery of the gap 20, which was surrounded by the tape (fixing member 16), the concave surface (surface 12a) of the first substrate 12, and the notch 24. The opening (injection portion 18) connecting with the space 22 was formed in the fixing member 16.

Preparation of Laminated Lens

A mixed solution was prepared by charging 0.035 parts by weight of dibutyltin chloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, and 1.5 parts by weight of Viosob 583 manufactured by BASF as an ultraviolet absorbing agent. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 µm PTFE filter to obtain the preparation solution. A viscosity of the preparation solution measured at 20° C. with a B-type viscometer was 46 mPa·s. The preparation solution was injected at an injection rate of 25 ml/min by an injection tool including a pipette tip through the opening (injection portion 18) positioned at the upper end of the injection molding apparatus 10 obtained as described above. As a result of observation, as shown in FIG. 2, it was observed that the preparation solution was mainly moved downward in the space 22 and the gap 20 was filled with the preparation solution from the lower portion of the space 22. After casting, a temperature was raised from 25° C. to 120° C. for 16 hours. The preparation solution was cooled to room temperature and removed from the glass mold (first substrate 12) to obtain the laminated lens in which the resin layer was laminated on the resin substrate (second substrate 14). Further, the obtained lens was annealed at 120° C. for 2 hours.

The results of evaluation are shown in Table-1.

Comparative Example 1

Preparation of Lens for Mold (Second Substrate 104) and Injection Molding Apparatus 100

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, 1.5 parts by weight of Viosob 583 manufactured by BASF as an ultraviolet absorbing agent, and 0.00005 parts by weight of Plast Blue 8514 manufactured by ARIMOTO CHEMICAL CO., LTD. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 µm PTFE filter to obtain the preparation solution. A casting mold was prepared in which a front glass mold (R of the concave surface facing a back glass mold was 215.80 mm) and the back glass mold (R of the convex surface facing the front glass mold was 75.53 mm) were fixed by the tape to face each other. The preparation solution was cast into the gap between the molds (separation distance of a center portion was 1.2 mm), and a temperature was raised from 25° C. to 120° C. for 16 hours. The preparation solution was cooled to room temperature and removed from the glass mold to obtain a lens having a diameter of 81 mm. The lens was processed to a diameter of 75 mm to prepare a second substrate (resin substrate) 104 shown in FIG. 8.

Figure 8:
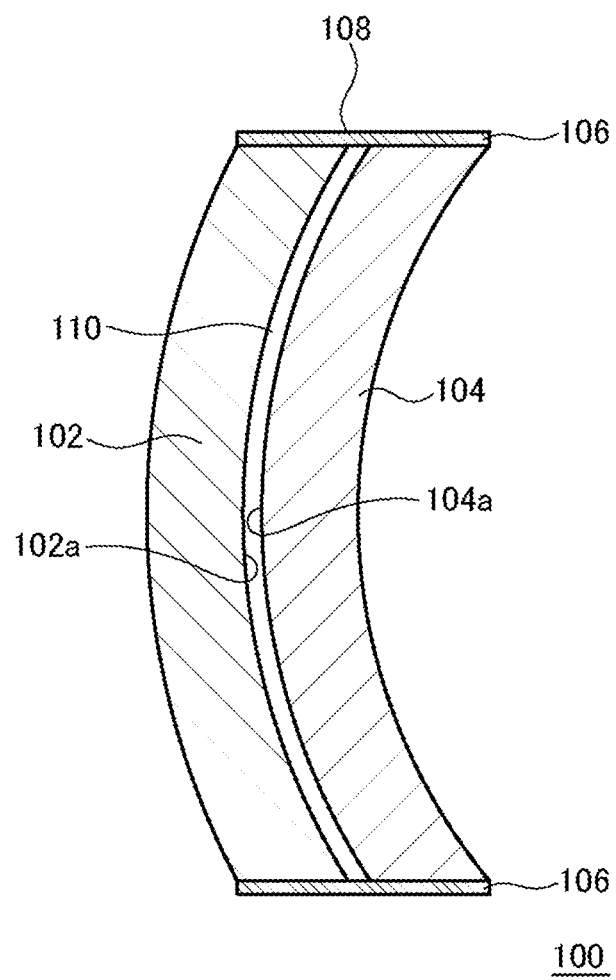
FIG. 8 is a schematic cross-sectional view schematically showing an injection molding apparatus used in a comparative example.

The glass mold having the concave surface (surface 102a) of which R was 215.80 mm was used as a first substrate 102, and the end portion of the first substrate 102 and the end portion of the second substrate 104 were wound and fixed by the tape (fixing member 106) such that the concave surface (surface 102a) of the first substrate 102 and the convex surface (surface 104a) of the second substrate 104 face each other to prepare an injection molding apparatus 100 including a gap 110, which is shown in FIG. 8. The separation distance of the center portion of the gap 110 was 0.5 mm. The opening (injection portion 108) connecting with the gap 110 was formed in the fixing member 106.

Preparation of Laminated Lens

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, and 1.5 parts by weight of Viosob 583 manufactured by BASF as an ultraviolet absorbing agent. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 μm PTFE filter to obtain the preparation solution. A viscosity of the preparation solution measured at 20° C. with a B-type viscometer was 35 mPa·s. The preparation solution was injected at an injection rate of 3 ml/min by an injection tool including a pipette tip through the opening (injection portion 108) positioned at the upper end of the injection molding apparatus 100 obtained as described above. As a result of observation, it was observed that the preparation solution traveled through the concave surface (surface 102a) of the first substrate 102 and the convex surface (surface 104a) of the second substrate 104, and the gap 110 was filled from the injection portion 108 from the lower portion while air was released from the injection portion 108. After casting, a temperature was raised from 25° C. to 120° C. for 16 hours. The preparation solution was cooled to room temperature and removed from the glass mold (first substrate 102) to obtain the laminated lens in which the resin layer was laminated on the resin substrate (second substrate 104). Further, the obtained lens was annealed at 120° C. for 2 hours.

The results of evaluation are shown in Table-1.

Comparative Example 2

Preparation of Lens for Mold (Second Substrate 104) and Injection Molding Apparatus 100

1.5 parts by weight of Tinuvin PS manufactured by BASF as the ultraviolet absorbing agent and 90.9 parts by weight of bis(2,3-epithiopropyl)disulfide were stirred and mixed at 30° C. to obtain a homogeneous solution. 9.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, 0.09 parts by weight of N,N-dicyclohexylmethylamine, and 0.02 parts by weight of N,N-dimethylcyclohexylamine were added in the homogeneous solution, and stirred and mixed at 20° C. to obtain a liquid mixture. The liquid mixture was defoamed at 600 Pa for 1 hour and filtered through a 1 μm PTFE filter to obtain the preparation solution. A casting mold was prepared in which a front glass mold (R of the concave surface facing a back glass mold was 215.80 mm) and the back glass mold (R of the convex surface facing the front glass mold was 75.53 mm) were fixed by the tape to face each other. The preparation solution was cast into the gap between the molds (separation distance of a center portion was 1.2 mm), and a temperature was raised from 25° C. to 120° C. for 16 hours. The preparation solution was cooled to room temperature and removed from the glass mold to obtain a lens having a diameter of 81 mm. The lens was processed to a diameter of 75 mm to prepare the second substrate (resin substrate) 104 shown in FIG. 6.

The glass mold having the concave surface (surface 102a) of which R was 215.80 mm was used as the first substrate 102, and the end portion of the first substrate 102 and the end portion of the second substrate 104 were wound and fixed by the tape (fixing member 106) such that the concave surface (surface 102a) of the first substrate 102 and the convex surface (surface 104a) of the second substrate 104 face each other to prepare the injection molding apparatus 100 including the gap 110, which is shown in FIG. 6. The separation distance of the center portion of the gap 110 was 0.5 mm. The opening (injection portion 108) connecting with the gap 110 was formed in the fixing member 106.

Preparation of Laminated Lens

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, and 1.5 parts by weight of Viosob 583 manufactured by BASF as the ultraviolet absorbing agent. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The polymerizable composition for the optical material was defoamed at 600 Pa for 1 hour and filtered through a 1 μm PTFE filter to obtain the preparation solution. A viscosity of the preparation solution measured at 20° C. with a B-type viscometer was 46 mPa·s. The preparation solution was injected at an injection rate of 2 ml/min by an injection tool including a pipette tip through the opening (injection portion 108) positioned at the upper end of the injection molding apparatus 100 obtained as described above. As a result of observation, it was observed that the preparation solution traveled through the concave surface (surface 102a) of the first substrate 102 and the convex surface (surface 104a) of the second substrate 104, and the gap 110 was filled from the injection portion 108 from the lower portion while air was released from the injection portion 108. After casting, a temperature was raised from 25° C. to 120° C. for 16 hours. The preparation solution was cooled to room temperature and removed from the glass mold (first substrate 102) to obtain the laminated lens in which the resin layer was laminated on the resin substrate (second substrate 104). Further, the obtained lens was annealed at 120° C. for 2 hours.

The results of evaluation are shown in Table-1.

Comparative Example 3

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, 1.5 parts by weight of Viosob 583 manufactured by BASF as an ultraviolet absorbing agent, and 0.00005 parts by weight of Plast Blue 8514 manufactured by ARIMOTO CHEMICAL CO., LTD. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The preparation solution was obtained after the polymerizable composition for the optical material was defoamed at 600 Pa for 1 hour and filtered through a 1 μm PTFE filter. A viscosity of the preparation solution measured at 20° C. with a B-type viscometer was 36 mPa·s. The preparation solution was injected into the injection molding apparatus 100 (4C plano mold in which the center thickness of the gap 110 was set to 0.5 mm), which is shown in FIG. 6, using the glass mold as the first substrate 102 and the glass mold as the second substrate 104 at an injection rate of 2 ml/min by an injection tool including a pipette tip through the opening (injection portion 108) positioned at the upper end. After casting, a temperature was raised from 25° C. to 120° C. for 16 hours. The preparation solution was cooled to room temperature and removed from the first substrate 102 and the second substrate 104 to obtain a lens having a diameter of 81 mm. Further, the obtained lens was annealed at 120° C. for 2 hours.

The results of evaluation are shown in Table-1.

Comparative Example 4

A mixed solution was prepared by charging 0.035 parts by weight of dibutyltin dichloride, 0.1 parts by weight of Zelec UN manufactured by Stepan Company, 50.6 parts by weight of a mixture of 2,5-bis(isocyanatomethyl)bicyclo-[2.2.1]-heptane and 2,6-bis(isocyanatomethyl)bicyclo-[2.2.1]-heptane, 1.5 parts by weight of Viosob 583 manufactured by BASF as an ultraviolet absorbing agent, and 0.00005 parts by weight of Plast Blue 8514 manufactured by ARIMOTO CHEMICAL CO., LTD. The mixed solution was stirred at 25° C. for 1 hour to be completely dissolved. Thereafter, 25.5 parts by weight of the thiol composition containing 4-mercaptomethyl-1,8-dimercapto-3,6-dithiaoctane and 23.9 parts by weight of the thiol composition containing pentaerythritol tetrakis(3-mercaptopropionate) were charged in this preparation solution, and were stirred at 25° C. for 30 minutes to obtain a homogeneous solution (polymerizable composition for the optical material). The preparation solution was obtained after the polymerizable composition for the optical material was defoamed at 600 Pa for 1 hour and filtered through a 1 μm PTFE filter. A viscosity of the preparation solution measured at 20° C. with a B-type viscometer was 36 mPa·s. An attempt was made to inject the preparation solution into the injection molding apparatus 100 (4C plano mold in which the center thickness of the gap 110 was set to 0.2 mm), which is shown in FIG. 6, using the glass mold as the first substrate 102 and the glass mold as the second substrate 104 by an injection tool including a pipette tip through the opening (injection portion 108) positioned at the upper end, but it was difficult to inject the preparation solution due to the intrusion of air, and casting was abandoned.

TABLE 1

|  | Example | | Comparative Example | | | |
| --- | --- | --- | --- | --- | --- | --- |
|  | 1 | 2 | 1 | 2 | 3 | 4 |
| Casting property | A | A | B | B | B | C |
| Appearance (presence or absence of air bubbles) | A | A | C | C | C | — |

As shown in Table-1, the injection molding apparatuses of Examples 1 and 2 had excellent casting property, and it was possible to homogeneously fill a narrow gap formed between the two substrates even with the composition having a high viscosity. Further, in the lenses obtained by the injection molding apparatuses of Examples 1 and 2, the mixing of air bubbles and the like were suppressed. As described above, it has been clarified that by using the injection molding apparatuses of Examples 1 and 2, the lens having an excellent appearance can be produced with a good yield.

This application claims priority based on Japanese Patent Application No. 2019-092682 filed on May 16, 2019, the entire disclosure of which is incorporated herein by reference.

REFERENCE SIGNS LIST 10, 100: injection molding apparatus
12, 102: first substrate
12a, 102a: surface (curved surface)
14, 15, 104: second substrate
14a, 15a, 15b, 104a: surface (curved surface)
16, 106: fixing member
18, 108: injection portion
20, 110: gap
22, 23: space
24: notch
30: laminated lens
32: first resin layer
32a: front surface
34: protrusion portion
36: second resin layer
36a: front surface
i: width of space 22 in thickness direction
ii: width of space 22 in diameter direction
iii: diameter of second substrate 36
a, b: radius of curvature
c, d: width of second substrate in thickness direction

The invention claimed is:

1. An injection molding apparatus comprising:
a substantially circular first substrate;
a substantially circular second substrate disposed to face a surface of the first substrate;
a fixing member which fixes a peripheral end portion of the first substrate and a peripheral end portion of the second substrate;
a gap formed by entire opposing surfaces of the first substrate and the second substrate;
an injection portion which is provided in the fixing member; and
a space connecting with the injection portion and the gap is provided in at least a part of a periphery of the gap;
wherein a width of the space in a thickness direction is larger than a width of the gap in the thickness direction, the width of the gap in the thickness direction is substantially the same through the entire gap, and
the injection portion injects a composition into the space.

2. The injection molding apparatus according to claim 1, wherein the space is provided over a substantially half of a circumference of the periphery of the gap.

3. The injection molding apparatus according to claim 1, wherein the space is provided over an entire periphery of the gap.

4. The injection molding apparatus according to claim 1, wherein the width of the gap in the thickness direction is 0.05 to 2 mm.

5. The injection molding apparatus according to claim 1, wherein the first substrate is a mold substrate having a forming surface for forming an objective surface of a lens, which is located on a second substrate side, and the second substrate is a resin substrate.

6. The injection molding apparatus according to claim 1, wherein the first substrate and the second substrate are mold substrates.

7. The injection molding apparatus according to claim 1, wherein a notch is provided in at least one of a periphery of the first substrate and a periphery of the second substrate, and
the notch forms the space.

8. The injection molding apparatus according to claim 1, wherein the second substrate is a resin substrate,
a notch is provided over an entire circumference of a periphery of the second substrate, and
the notch forms the space.

9. The injection molding apparatus according to claim 1, wherein the surface of the first substrate is a curved surface,
the gap is provided between the surface and a curved surface of the second substrate facing the surface,
at least one of the curved surface of the first substrate and the curved surface of the second substrate has a radius of curvature of at least a part of the curved surface of a periphery thereof smaller than a radius of curvature of the curved surface surrounded by the periphery, and
the space is formed in at least a part of the periphery of the gap.

10. The injection molding apparatus according to claim 1, wherein the second substrate is a resin substrate,
the surface of the first substrate is a curved surface,
the gap is provided between the surface and a curved surface of the second substrate facing the surface,
a radius of curvature of an entire circumference of a periphery of the second substrate is smaller than a radius of curvature of the curved surface surrounded by the periphery, and
the space is formed in the periphery of the gap.

11. The injection molding apparatus according to claim 1, wherein the fixing member is a tape or a gasket.

12. An injection molding method of a composition, wherein the injection molding apparatus according to claim 1 is disposed such that the injection portion is positioned above, and
the injection molding method comprises:
a step of injecting the composition from the injection portion into the space; and
a step of filling the gap with the composition through the space.

13. The injection molding method of a composition according to claim 12,
wherein in the step of injecting the composition, a viscosity of the composition is 5 to 1000 mPa·s.

14. The injection molding method according to claim 12, wherein the second substrate is a resin substrate,
the resin substrate is a thiourethane resin consisting of an isocyanate compound and a thiol compound, and
the composition includes the isocyanate compound and the thiol compound,
wherein the isocyanate compound is at least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate, and
wherein the thiol compound is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

15. The injection molding method according to claim 14, wherein the isocyanate compound and the thiol compound constituting the resin substrate are the same as the isocyanate compound and the thiol compound contained in the composition, respectively.

16. A production method of a molded product,
wherein the injection molding apparatus according to claim 1 is disposed such that the injection portion is positioned above, and
the production method comprises:
a step of injecting the composition from the injection portion into the space;
a step of filling the gap with the composition through the space; and
a step of curing the composition.

17. The production method of a molded product according to claim 16,
wherein in the step of injecting the composition, a Viscosity of the composition is 5 to 1000 mPa·s.

18. The production method of a molded product according to claim 16,
wherein the second substrate is a resin substrate,
the resin substrate is a thiourethane resin consisting of an isocyanate compound and a thiol compound, and
the composition includes the isocyanate compound and the thiol compound,
wherein the isocyanate compound is at least one selected from xylylene diisocyanate, phenylene diisocyanate, tolylene diisocyanate, diphenylmethane diisocyanate, 2,5-bis(isocyanatomethyl)bicyclo-[2.2.1]-heptane, 2,6-bis(isocyanatomethyl)bicyclo-[2.2.1]-heptane, hexamethylene diisocyanate, pentamethylene diisocyanate, isophorone diisocyanate, bis(isocyanatomethyl)cyclohexane, and dicyclohexylmethane diisocyanate, and
wherein the thiol compound is at least one selected from the group consisting of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 4-mercaptomethyl-1,8-dimercapto-3,6-dithiaoctane, and pentaerythritol tetrakis(3-mercaptopropionate).

19. The production method of a molded product according to claim 18,
wherein the isocyanate compound and the thiol compound constituting the resin substrate are the same as the isocyanate compound and the thiol compound contained in the composition, respectively.

* * * * *